United States Patent [19]
Gansert et al.

[11] Patent Number: 4,713,573
[45] Date of Patent: Dec. 15, 1987

[54] TRIGGER MECHANISM CONSTRUCTION FOR AN AUTOMOTIVE PASSENGER RESTRAINT SYSTEM

[75] Inventors: Willi Gansert, Kornwestheim; Eduard Lochbrunner, Hemmingen; Harry Slansky, Mühlacker, all of Fed. Rep. of Germany

[73] Assignee: Robert Bosch GmbH, Stuttgart, Fed. Rep. of Germany

[21] Appl. No.: 734,872

[22] Filed: May 16, 1985

[30] Foreign Application Priority Data

Jun. 29, 1984 [DE] Fed. Rep. of Germany ....... 3424005

[51] Int. Cl.⁴ .......................................... H01L 41/08
[52] U.S. Cl. .................... 310/329; 310/330; 310/332
[58] Field of Search .............. 310/330–332, 310/329, 348; 180/274, 282; 280/728–730, 734, 735; 307/9, 10 R; 340/52 H; 200/61.45

[56] References Cited

U.S. PATENT DOCUMENTS

| | | | |
|---|---|---|---|
| 3,113,223 | 12/1963 | Smith et al. | 310/331 X |
| 3,119,047 | 1/1964 | Michalski | 340/825.72 X |
| 3,337,805 | 8/1967 | Joseph | 340/825.72 X |
| 3,438,037 | 4/1969 | Leland | 340/825.72 |
| 3,701,903 | 10/1972 | Merhar | 310/329 X |
| 3,891,963 | 6/1975 | Herbert | 307/149 X |
| 3,971,028 | 7/1976 | Funk | 315/159 X |
| 4,101,886 | 7/1978 | Grimes et al. | 307/140 X |
| 4,223,301 | 9/1980 | Grimes et al. | 307/140 X |
| 4,305,013 | 12/1981 | Baier et al. | 310/329 X |
| 4,333,029 | 6/1982 | Kolm et al. | 310/332 X |
| 4,348,905 | 12/1982 | Nishimura et al. | 310/329 X |
| 4,465,956 | 8/1984 | Fowler | 307/115 X |
| 4,523,193 | 6/1985 | Levinson et al. | 340/825.69 |
| 4,605,927 | 8/1986 | Katz et al. | 340/539 X |

OTHER PUBLICATIONS

*Proceedings of the I.R.E.*, vol. 42, No. 11, Nov. 1954, pp. 1612, 1613.

*Primary Examiner*—Mark O. Budd
*Attorney, Agent, or Firm*—Frishauf, Holtz, Goodman & Woodward

[57] ABSTRACT

To permit direct attachment of a deceleration sensing element to a printed circuit board or the like, a housing (2) made of insulating material retains therein a flexing or bending piezo-ceramic transducer (4) which is electrically connected to terminals (5) passing through the housing, spaced by standard printed circuit board hole spacings from each other; electrical connection between the piezo-ceramic flexing or bending transducer (4) and the terminals (5) is obtained by an electrically conductive adhesive (6) filled into chambers formed in the housing and extending from both sides of the flexing or bending transducer. The housing is preferably encapsulated by a coating of silicone rubber, and can be inserted into a groove (9) in a support side wall (1) by an externally projecting winged spring (10), and secured therein by an adhesive (8).

20 Claims, 2 Drawing Figures

TRIGGER MECHANISM CONSTRUCTION FOR AN AUTOMOTIVE PASSENGER RESTRAINT SYSTEM

Reference to related applications, assigned to the assignee of the present invention, the disclosure of which is hereby incorporated by reference: U.S. Ser. No. 631,933, Mattes et al, filed July 18, 1984; U.S. Ser. No. 632,379, Gademann et al, filed July 19, 1984.

The present invention relates to the construction of a trigger mechanism for an automotive passenger restraint system, such such as a seat/shoulder belt tightening or belt locking system, an air bag, or any other type of passenger restraint system.

BACKGROUND

The referenced application Ser. No. 632,379, filed July 19, 1984, describes a triggering arrangement for a passenger restraint system in which a deceleration sensor is provided which, in combination with an evaluation circuit, is secured to a common support plate, located in a housing. Preferably, the support plate is a metal plate. The metal plate and the housing are connected, preferably by a screw connection, with a wall of the triggering device, since the inertia of the metal plate does not permit an independent connection of a printed circuit board or the like.

THE INVENTION

It is an object to simplify the interconnection between a trigger mechanism and a printed circuit board or the like so that the overall construction of the passenger restraint trigger apparatus will be improved, easier to make, and easier to assemble.

Briefly, a deceleration sensor is located within the housing and electrical terminal elements project from the inside of the housing to the outside thereof; the externally projecting portions of the terminals extend far enough for direct connection into a printed circuit board, for example by being passed through openings of the printed circuit board. The housing is made of electrically insulating material, and an electrically conductive adhesive is used to adhesively connect, electrically as well as mechanically, portions of the terminals which are inside the housing with a deceleration sensing element, such as a flexing-type transducer.

The arrangement in accordance with the invention has the advantage that the terminals of the deceleration sensing structure can be readily adapted for mounting, directly, in a printed circuit board. Most printed circuit boards have openings spaced apart by standard distances—for example in a square pattern of 1/10 inch spacing (2.54 mm spacing of holes). By use of plastic, and the adhesive connection, the electrical characteristics of the sensor are excellent and, without difficulty, the dimension of the deceleration sensor can be reduced further beyond that previously known, for example in the order of about 1 cm.

The actual deceleration sensing element is preferably formed as a piezo-ceramic flexing or bending element. In accordance with a feature of the invention, use of such an element readily permits placing a conductive adhesive to respective opposite sides of the flexing element, typically a plate, formed as a piezo-ceramic bimorph. A gel-type embedding element may be used to dampen oscillations of the oscillating or flexing element; the gel-type filling is particularly desirable since it permits control of the mechanical resonant frequency of the flexing transducer. Using a cast gel is simple in manufacture and can be easily carried out. The housing can be tightly jacketed, preferably by immersing the finished structure into a silicone rubber. This insures excellent protection with respect to mechanical, chemical and electrical disturbances. A groove-and-spring connection between the housing of the acceleration sensor and a housing wall of the overall structure, or some other mechanical element which is to trigger the transducer to provide a trigger output, for example in case of a vehicle collision, permits simple and reliable attachment to a portion of the vehicle, while insuring good mechanical coupling therewith, particularly if the connection additionally includes an adhesive.

The system is particularly suitable for a seatbelt or shoulder belt or combination lap-shoulder belt tightening or locking system.

DRAWINGS

DETAILED DESCRIPTION

Figure 1:
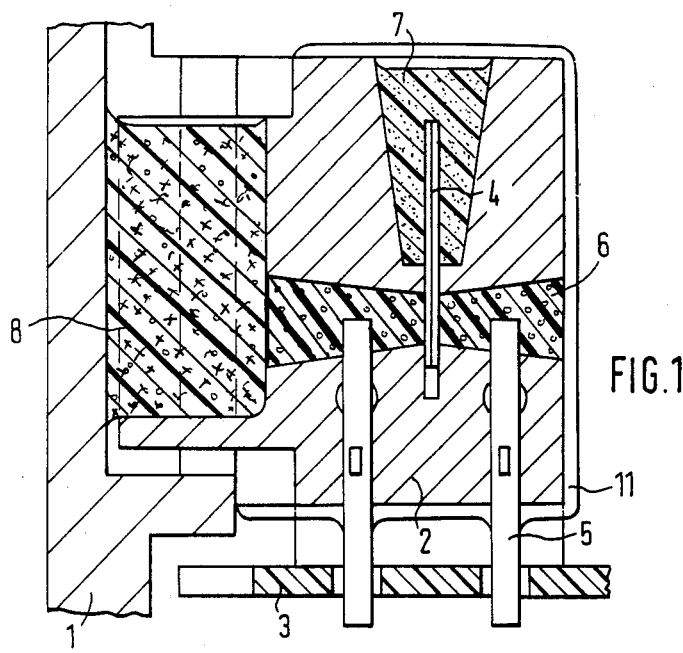
FIG. 1 is a longitudinal sectional view through a trigger construction in accordance with the invention.
Figure 2:
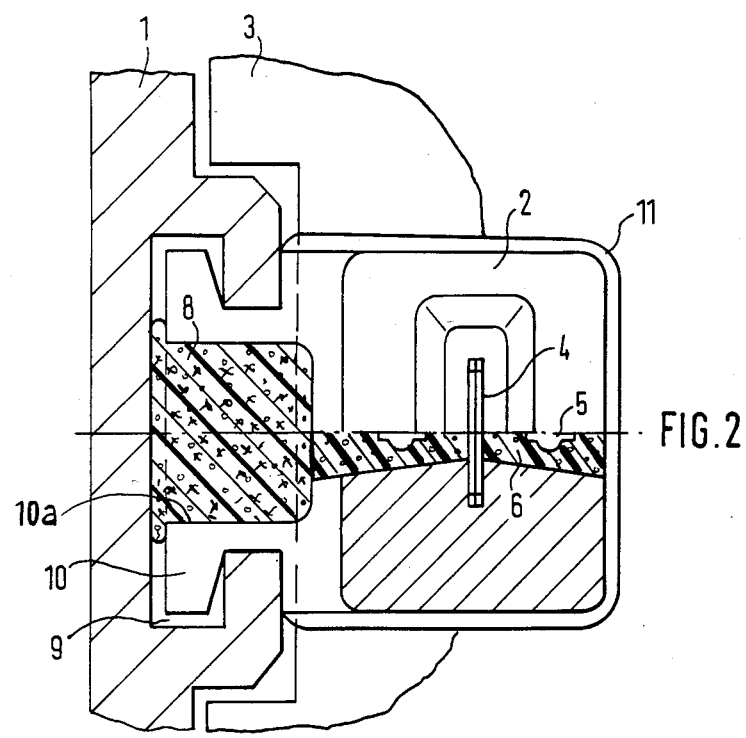
FIG. 2 is a part-top, part-sectional view of the apparatus of FIG. 1.

A housing wall 1 is provided to hold the trigger mechanism thereon. The housing wall 1—see FIG. 1—retains thereon a trigger housing 2 of electrically insulating material, preferably plastic. The trigger housing 2 is seated on a printed circuit board 3, or a similar conductor carrier substrate. The interior of the trigger housing 2 is formed with a groove into which a piezo-ceramic element 4 is inserted, the piezo-ceramic element extending from the groove into a chamber 7, which is filled with a gel filling. Upwardly of the groove, and extending towards both sides therefrom, the trigger housing 2 is formed with openings defining a chamber which is subdivided by the piezo-ceramic element 4 into two chamber portions. Both chamber portions spaced from the ceramic plate 4 are filled with an electrically conductive adhesive 6. Connecting terminal pins 5 extend into the respective chamber portions. The connecting terminal pins 5 extend outside of the trigger housing 2 and into suitable connection openings formed in the circuit substrate 3. The electrically conductive adhesive 6 forms the electrical connection between the terminal pins 5 and the piezo-ceramic plate 4. The electrically conductive adhesive 6 at the same time mechanically secures the piezo-ceramic plate 4 in position in the housing. As best seen in FIG. 2, adhesive 6 is in surface engagement with a wall portion of the chamber within which the piezo-ceramic plate 4 is located, as well as with a surface region of the plate 4, of sufficient size to adhesively secure the piezoceramic plate 4 in the housing 2. The gel 7, which is cast into a suitable opening into which the ceramic plate 4 extends, is used as a dampening structure, since the piezo-ceramic plate 4 forms a bending or flexing oscillating element which, upon mechanical shock, begins to oscillate at an oscillation frequency which depends on its insertion into the groove within the housing 2 in which it is held. The gel filling is preferably separated by a thin region of the housing from the electrically conductive adhesive, which thin region provides sufficient clearance for oscillation of the oscillating piezo-ceramic plate which, close to the attachment end thereof, is still of very low amplitude.

The housing 2 includes a spring 10 which is arranged to fit within a groove 9 formed in the wall 1 of the overall structure of the housing. The groove 9 is undercut, in form of a pocket, so that the trigger housing 2 can be inserted, from above, as best seen in FIG. 2, by engaging the spring 10 within the undercut groove 9. The spring 10 is preferably centrally relieved by a cut 10a which, in cross section, is cup-shaped, to form a recess which, after introduction of the trigger housing 2 with the spring 10 into the groove 9, is then filled with an adhesive 8 to insure tight mechanical coupling between the wall 1 of the structure forming the overall housing and the trigger element housing 2. The inner walls 10a of the opening also contribute to the resiliency and deflectability of the spring 10 upon introduction of the trigger housing into the groove 9 of the side wall 1. The trigger housing 2 is surrounded by an outer coating 11 of silicone rubber.

Various changes and modifications may be made within the scope of the inventive concept.

A suitable pourable setting or curing and electrically conductive adhesive 6 is a two-component epoxy resin, in which the resin has a 50% silver additive as a filler, and the hardener component has a 78% silver filler additive (percentages by weight).

A suitable adhesive 8 is a one-component epoxy resin with a mineral filler.

A suitable gel 7 is a two-component unfilled silicondieelectric gel, for example of the type commercially available by Dow Corning Q3-6527, comp. A and B.

I claim:

1. Trigger mechanism construction for an automotive passenger restraint system comprising
    a housing (2);
    a protective jacket (11) of silicone rubber surrounding said housing (2);
    a circuit substrate board (3) having apertures formed therein;
    a deceleration sensor (4) located within the housing;
    electrical terminal means (5) having a portion projecting inside the housing, and electrically connected to the deceleration sensor;
    externally formed projections on said terminal means (5) extending outside of the housing (2) for electrically and mechanically connecting the housing and the circuit substrate (3),
    the external projections extending into openings of the circuit substrate,
    and an electrically conductive adhesive (6) adhesively electrically and mechanically connecting the portions of the terminal means (5) located inside of the housing with the deceleration sensor.

2. Construction according to claim 1, wherein the deceleration sensor comprises a piezo-electric flexing or bending transducer.

3. Construction according to claim 2, wherein the piezo-electric flexing or bending transducer is a bimorph.

4. Construction according to claim 2, further including an opening formed in the housing into which the piezo-electric flexing or bending transducer extends;
    and a gel (7) filled into said opening and damping oscillations of said transducer.

5. Construction according to claim 1, further including a housing support wall (1) formed with a groove therein;
    and a spring element (10) secured to said housing (2) and projecting outwardly thereof, shaped to fit in said groove (9), and inserted therein to retain the housing (2) on the support wall.

6. Construction according to claim 5, wherein the groove (9) is an undercut groove, and the spring element (10) has projecting wings fitting into the undercut.

7. Construction according to claim 5, further including an adhesive (8) connecting the spring and the groove (9) after insertion of the housing, and with it the spring into the groove for connection to said wall (1).

8. Construction according to claim 1, wherein the conductor substrate is formed with openings of standard 2.54 mm spacing;
    and wherein said terminal means (5) are spaced from each other by said standard spacing.

9. Construction according to claim 1, wherein the housing comprises plastic.

10. Trigger mechanism construction for an automotive passenger restraint system comprising
    a housing support wall (1);
    a housing (2) of insulating material;
    a circuit substrate board (3) having apertures formed therein;
    a deceleration sensor (4) located within the housing;
    electrical terminal means having a portion projecting inside the housing and electrically connected to the deceleration sensor;
    externally formed projections on said terminal means (5) extending outside of the housing (2) for electrically and mechanically connecting the housing and the circuit substrate (3), the electrical projections extending into openings of the circuit substrate;
    an electrically conductive adhesive (6) adhesively electrically and mechanically connecting the portions of the terminal means (5) located inside of the housing with the deceleration sensor;
    wherein the housing support wall (1) is formed with a groove therein; and
    a spring element (10) is provided secured to said housing (2) and projecting outwardly thereof, shaped to fit into said groove (9) and inserted therein to retain the housing (2) on the support wall.

11. Construction according to claim 10, wherein the deceleration sensor comprises a piezo-electric flexing or bending transducer.

12. Construction according to claim 11, wherein the piezo-electric flexing or bending transducer is a bimorph.

13. Construction according to claim 11, further including an opening formed in the housing into which the piezo-electric flexing or bending transducer extends;
    and a gel (7) filled into said opening and damping oscillations of said transducer.

14. Construction according to claim 10, wherein the groove (9) is an undercut groove, and the spring element (10) has projecting wings fitting into the undercut.

15. Construction according to claim 10, further including an adhesive (8) connecting the spring and the groove (9) after insertion of the housing, and with it the spring into the groove for connection to said wall (1).

16. Construction according to claim 10, wherein the conductor substrate is formed with openings of standard 2.54 mm spacing;
    and wherein said terminal means (5) are spaced from each other by said standard spacing.

17. Construction according to claim 10, wherein the housing comprises plastic.

18. Trigger mechanism construction for an automotive passenger restraint system having
a housing (2) of electrically insulating material;
a protective jacket (11) of silicone rubber surrounding said housing (2);
a circuit substrate board (3) having apertures formed therein;
a deceleration sensor (4) comprising a piezo-electric flexing or bending transducer located within the housing and having two opposite sides;
electrical terminal means (5) having a portion projecting inside the housing and a portion defining externally extending projections, extending outside of the housing and the circuit substrate board (3), the external projections extending into openings of the circuit substrate board;
the portions of the electrical terminal means extending inside the housing being space from the respective sides of the deceleration sensor (4);
and an electrically conductive adhesive (6) adhesively electrically directly connecting the portion of the terminal means (5) located inside of the housing with the deceleration sensor,
said electrically conductive adhesive (6) being in adhesive surface engagement with a portion of the inside of the housing and in surface engagement with the bending transducer over an area sufficient to mechanically secure the sensor in position in the housing;
said electrically conductive adhesive also forming the electrical connection from the bending transducer to the inwardly extending portion of the respective electrical terminal means spaced from the bending transducer.

19. Construction according to claim 18, wherein the electrically conductive adhesive comprises a resin with an electrically conductive metal filler additive.

20. Construction according to claim 19, wherein said resin comprises an epoxy resin with said metal additive.

* * * * *